(12) United States Patent
Wilcox et al.

(10) Patent No.: US 7,272,741 B2
(45) Date of Patent: Sep. 18, 2007

(54) HARDWARE COORDINATION OF POWER MANAGEMENT ACTIVITIES

(75) Inventors: Jeffrey R. Wilcox, Folsom, CA (US); Shivnandan Kaushik, Portland, OR (US); Stephen H. Gunther, Beaverton, OR (US); Devadatta V. Bodas, Federal Way, WA (US); Siva Ramakrishnan, Beaverton, OR (US); David Poisner, Folsom, CA (US); Bernard J. Lint, Mountain View, CA (US); Lance E. Hacking, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 287 days.

(21) Appl. No.: 10/859,892

(22) Filed: Jun. 2, 2004

(65) Prior Publication Data

US 2005/0273633 A1 Dec. 8, 2005

(51) Int. Cl.
*G06F 1/08* (2006.01)
(52) U.S. Cl. .............. 713/503; 713/1; 713/2; 713/400; 713/401; 713/500; 713/501; 713/502
(58) Field of Classification Search ............... None
See application file for complete search history.

(56) References Cited

U.S. PATENT DOCUMENTS

| 5,388,265 | A | 2/1995 | Volk |
| 5,598,537 | A | 1/1997 | Swanstrom et al. |
| 5,752,050 | A | 5/1998 | Hernandez et al. |
| 5,784,628 | A | 7/1998 | Reneris |
| 5,905,900 | A | 5/1999 | Combs et al. |
| 6,125,450 | A * | 9/2000 | Kardach ............ 713/323 |
| 6,760,852 | B1 | 7/2004 | Gulick |
| 6,971,033 | B2 * | 11/2005 | Ma ............ 713/300 |
| 7,028,200 | B2 * | 4/2006 | Ma ............ 713/324 |
| 2003/0041272 | A1 | 2/2003 | Nguyen |
| 2003/0163745 | A1 | 8/2003 | Kardach |
| 2003/0221026 | A1 | 11/2003 | Newman |
| 2004/0022225 | A1 | 2/2004 | Liang et al. |
| 2004/0025063 | A1 | 2/2004 | Riley |
| 2005/0113103 | A1 | 5/2005 | Snowden et al. |
| 2005/0136961 | A1 | 6/2005 | Simonsson et al. |

(Continued)

FOREIGN PATENT DOCUMENTS

WO WO-02/19078 3/2002

(Continued)

OTHER PUBLICATIONS

Office Action from UK Patent Application No. 0425264.9, mailed Sep. 22, 2006, 6 pgs.

(Continued)

*Primary Examiner*—A. Elamin
(74) *Attorney, Agent, or Firm*—Blakely, Sokoloff, Taylor & Zafman LLP (57) ABSTRACT

Systems and methods of managing power provide for receiving notification of a pending power state transition and using coordination hardware to determine whether the power state transition in a primary device is permitted by a set of secondary devices. In one embodiment, the primary device shares a resource with the set of secondary devices.

31 Claims, 4 Drawing Sheets

U.S. PATENT DOCUMENTS

2005/0273633 A1    12/2005    Wilcox et al.

FOREIGN PATENT DOCUMENTS

WO    WO 2004/070619 A3    8/2004

OTHER PUBLICATIONS

Office Action from UK Patent Application No. 0609876.8, mailed Sep. 22. 2006. 5 pgs.

Office Action from U.S. Appl. No. 10/871.638, mailed Sep. 28, 2006, 13 pgs.

First Office Action (and English translation) from CN Application No. 200410101227.1, mailed Dec. 1, 2006, 27 pgs.

Abstract from WO0219078, corresponding to reference CN1449517A cited in CN OA above, 7 pgs.

42P18868XCN 1st OA mailed Dec. 1, 2006, 26 pgs.

* cited by examiner

HARDWARE COORDINATION OF POWER MANAGEMENT ACTIVITIES

CROSS-REFERENCE TO RELATED APPLICATIONS

The present application is related to the U.S. application Ser. No. 10/859,656, entitled "Packet Exchange for Controlling System Power Modes" by Jeffrey R. Wilcox, et al., still pending and filed on even date herewith.

BACKGROUND

1. Technical Field

Embodiments of the present invention generally relate to power management. More particularly, certain embodiments relate to the coordination of power management activities between components of a computer system.

2. Discussion

Power management in modern computer systems plays an important role in conserving energy, managing heat dissipation, and improving system performance. For example, modern computer systems are increasingly designed to be used in settings where a reliable external power supply is not available, making power management important for energy conservation. Even when reliable external power supplies are available, careful power management within the computing system can reduce heat produced by the system enabling improved performance of the system. Computing systems generally have better performance at lower ambient temperatures because key components can run at higher speeds without damaging their circuitry. Many computing platforms such as dense servers, desktop computers and mobile computers, however, are constrained by heat dissipation issues.

One approach to power management involves the implementation of various power states in system devices, where placing a device into a relatively low power state reduces energy consumption. The tradeoff to operating a device in a low power state is typically a reduction in the level of performance of the device. It should be noted, however, that the operation of some devices may in fact be dependent upon on the operation of other devices. For example, a processor might have a cache that is snooped by other processors, where placing the processor in a lower power state could negatively affect snoop latencies experienced by the other processors. Simply put, a power state transition in one device may prevent other devices from functioning at a desired level of performance.

While the coordination of such device dependencies may be implemented through software, there remains considerable room for improvement. For example, as the number of system components increases, describing all of the device interrelationships in software can become very complex. Furthermore, in systems where multiple instances of an operating system are running (say, for example, one instance on each processor or package in a multiprocessor server), each instance of the operating system cannot take into consideration the power states of processors that it does not directly control or have access to internal device indicators. It should also be noted that some software coordination approaches poll the various devices for power condition updates, and can experience a significant delay in responding to the updates. The result is often a net energy increase and/or performance loss. Other software coordination approaches rely upon interrupts for power condition updates, where an increased number of dependencies can cause an increased potential for interrupts and a deterioration in performance.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
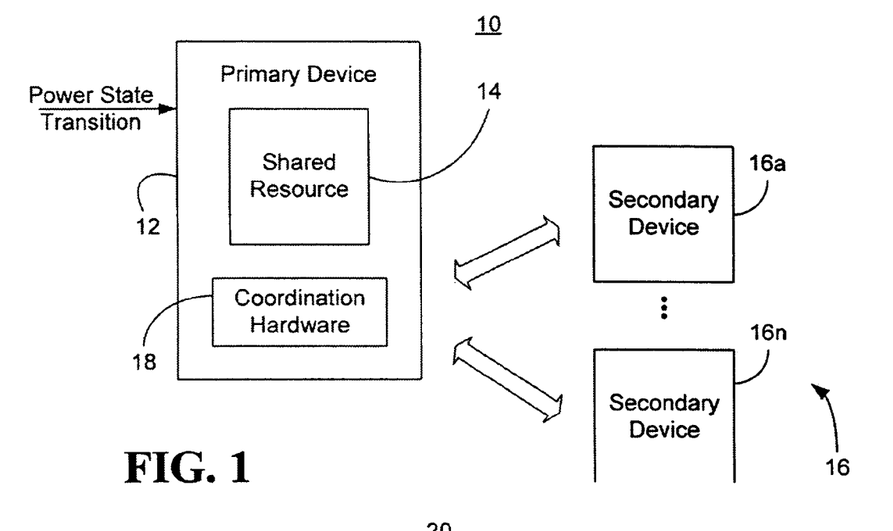
FIG. 1 is a block diagram of an example of a system having coordination hardware according to one embodiment of the invention.

FIG. 1 shows a system 10 in which a primary device 12 shares a resource 14 with a set of secondary devices 16 (16a-16n). The resource 14 can be a memory structure, controller, interface, etc., and the term "device" is used to refer to any physical agent or node of a system. Examples of devices include, but are not limited to, central processing units (CPUs), graphics controllers and cache controllers. It should also be noted that the primary device 12 could have multiple shared resources. Furthermore, the terms "primary" and "secondary" are only used for ease of discussion and can apply to any of the devices shown depending on the perspective from which the discussion is made. Because the primary device 12 and the secondary devices 16 share the resource 14, power state changes within the primary device 12 have the potential to negatively (or positively) affect the performance of the secondary devices 16. Accordingly, the primary device 12 uses coordination hardware 18 to determine whether pending power state transitions in the primary device 12 are permitted by the secondary devices 16.

The coordination hardware can include an embedded logic circuit of an application specific integrated circuit (ASIC) or any other commercially available hardware component. By using coordination hardware 18 to resolve the dependency issues associated with power state transitions, the system 10 is able to achieve greater efficiency and enhanced performance. For example, the coordination hardware 18 functions based on the dependencies associated with power state transitions in the primary device 12, and does not require knowledge of other system dependencies. As a result, systems having a relatively large number of interdependent devices and/or components can benefit from reduced complexity.

Although the coordination hardware 18 is shown as being incorporated into the primary device 12, the coordination hardware 18 could also be implemented in a separate device and/or package. Furthermore, the number of devices can vary depending upon the circumstances. As already noted, the terms "primary" and "secondary" are only used to facilitate the discussion. For example, the device 16a could also be viewed as a primary device with respect to coordination hardware within the device 16a. Likewise, the device 12 could be viewed as a secondary device from the perspective of the device 16a (provided the device 12 depends upon power state transitions within the device 16a).

Figure 2A:
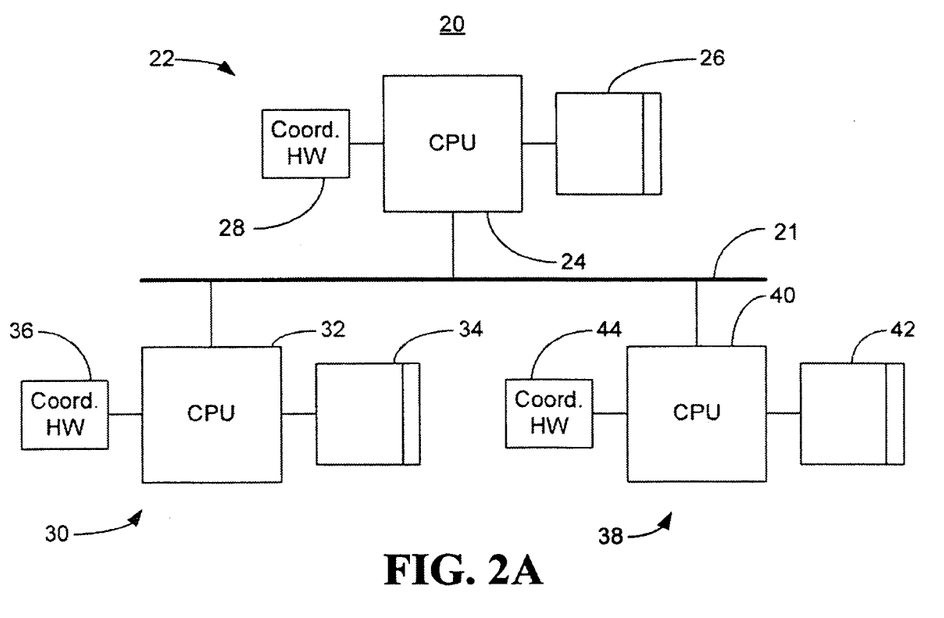
FIG. 2A is a diagram of an example of a computer system according to one embodiment of the invention.

Turning now to FIG. 2A, a computer system 20 is shown to better illustrate certain advantages associated with the principles described herein. In particular, a first processor node 22 has a first central processing unit (CPU) 24, a first cache 26 and first coordination hardware 28. Similarly, a second processor node 30 includes a second CPU 32, a second cache 34 and second coordination hardware 36, and a third processor node 38 includes a third CPU 40, a third cache 42 and third coordination hardware 44. Assume, for example, that the first cache 26 is coherent with the second cache 34 and the third cache 42, and therefore must be "snooped" by the second and third CPUs 32, 40 in order to ensure coherency. Assume further that the first processor node 22 receives a software notification of a planned power state transition in the first CPU 24. The power state transition might be from state "P2" to "P4", where state P4 provides lower power consumption and lower performance for the first CPU 24 than state P2. Lower performance could be characterized by the suspension of certain features, where different power states suspend different features. Therefore, the above example of a transition from state P2 to P4 might result in a higher latency and/or decrease in bandwidth. It should be noted that alternatively, the transition could be to a state that provides higher power consumption and performance.

The coordination hardware 28 identifies the second and third processor nodes 30, 38 as being dependent upon the power state transition. The identification can be made by consulting either an explicit or an implicit dependencies list that is dedicated to the first processor node 22. The dependencies list may be generated by a number of different mechanisms. For example, the list could be stored in a register by basis input/output system (BIOS) software or a system management controller at the time of startup. The dependencies list can also take on a number of different formats. For example, a single list could be used for every state type and level being coordinated. Alternatively, there could be a unique list for each state type and level. It should be noted that the dependencies list could be implicit in cases where all secondary devices in the system are deemed to be dependent on state transitions in the primary device. In such a case, a list would not need to be consulted. One example of this type of scenario could be a system having only two nodes.

Once the appropriate dependencies have been identified, the coordination hardware 28 then queries the second and third processor nodes 30, 38 to determine whether the power state transition is permitted. Depending upon the status of each of the CPUs 32, 40 with respect to their own power management policies, the power state transition may or may not be permitted. For example, the second CPU 32 may not be currently running a thread and could therefore have a policy that permits the transition. On the other hand, the third CPU 40 could be running a high priority thread and anticipating the need to snoop the first cache 26. If, for example, the software controlling the third CPU 40 requires a minimum power state level of P2 under these conditions, the transition to level P4 would be denied. In such a case, since all of the processors dependent upon the transition have not approved the power state transition, the first CPU 24 would remain in power state P2. Additional details of the protocols for implementing hardware coordinated power state transition are provided below.

Figure 2B:
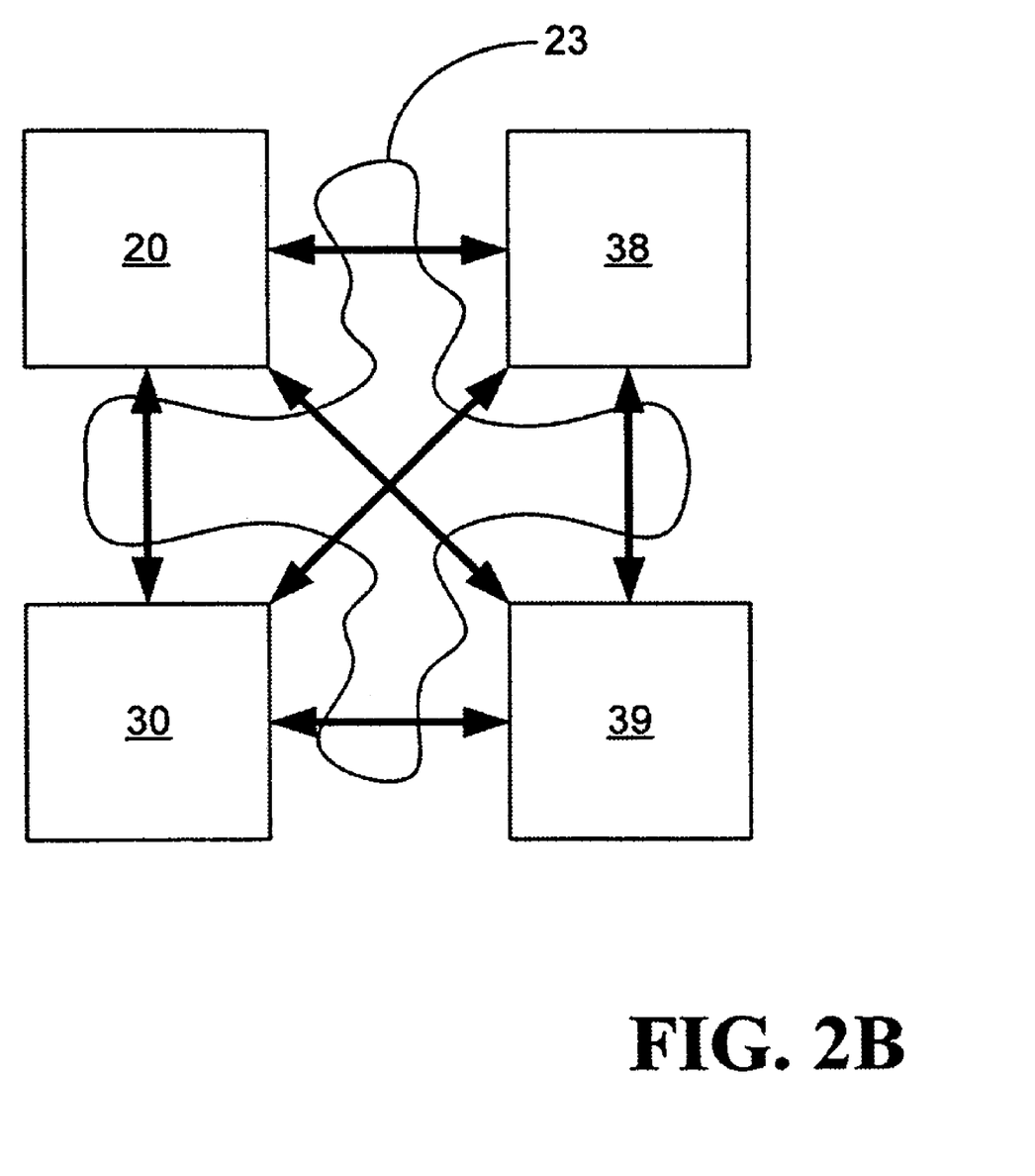
FIG. 2B is a diagram of an example of a computer system according to an alternative embodiment of the invention.

Although the processor nodes 20, 30 and 38 are shown as being interconnected by a single interface 21, other approaches to connecting the devices can be used. For example, multiple buses and intermediate bridges between the buses can be incorporated in to the interface 21. Indeed, the interface 21 can represent a portion of a point-to-point fabric, which interconnects all of the devices in the computer system 20. An example of such a topology is shown in FIG. 2B. In the illustrated embodiment, a point-to-point network interconnect 23 is coupled to processor nodes 20, 30, 38 and 39. In the point-to-point fabric topology, each node has a direct link to other nodes in the system. The network interconnect 23 can also have a layered communication protocol in which power management messages are transferred between nodes in packets at a protocol layer. Packets are data structures having a header and payload; where, the header includes "routing information" such as the source address and/or destination address of the packet; and/or, a connection identifier that identifies a connection that effectively exists in the network interconnect 23 to transport the packet. Other layers such as transport, routing, link and physical layers can reside beneath the protocol layer in the hierarchy. Table I summarizes one approach to implementing the layered communication protocol.

TABLE I

| Layer | Description |
| --- | --- |
| Protocol | Higher level communication protocol between nodes such as power management, cache coherence, ordering, peer-to-peer I/O, interrupt delivery, etc. |
| Transport | End-to-end reliable transmission between two agents |
| Routing | Flexible and distributed way to route packets from a source to a destination |
| Link | Reliable data transfer and flow control between two directly connected agents & virtualization of the physical channel |
| Physical | Electrical transfer of information between two directly connected agents. |

The transport and routing layers may be needed for certain platform options only. In desktop/mobile and dual processor systems, for example, the functionality of the routing layer can be embedded in the link layer. Simply put, layers may be added or removed from the protocol without parting from the spirit and scope of the illustrated embodiments. Furthermore, other topologies such as ring topologies can be used depending upon scalability and other implementation concerns.

Figures 3, 4, 5:
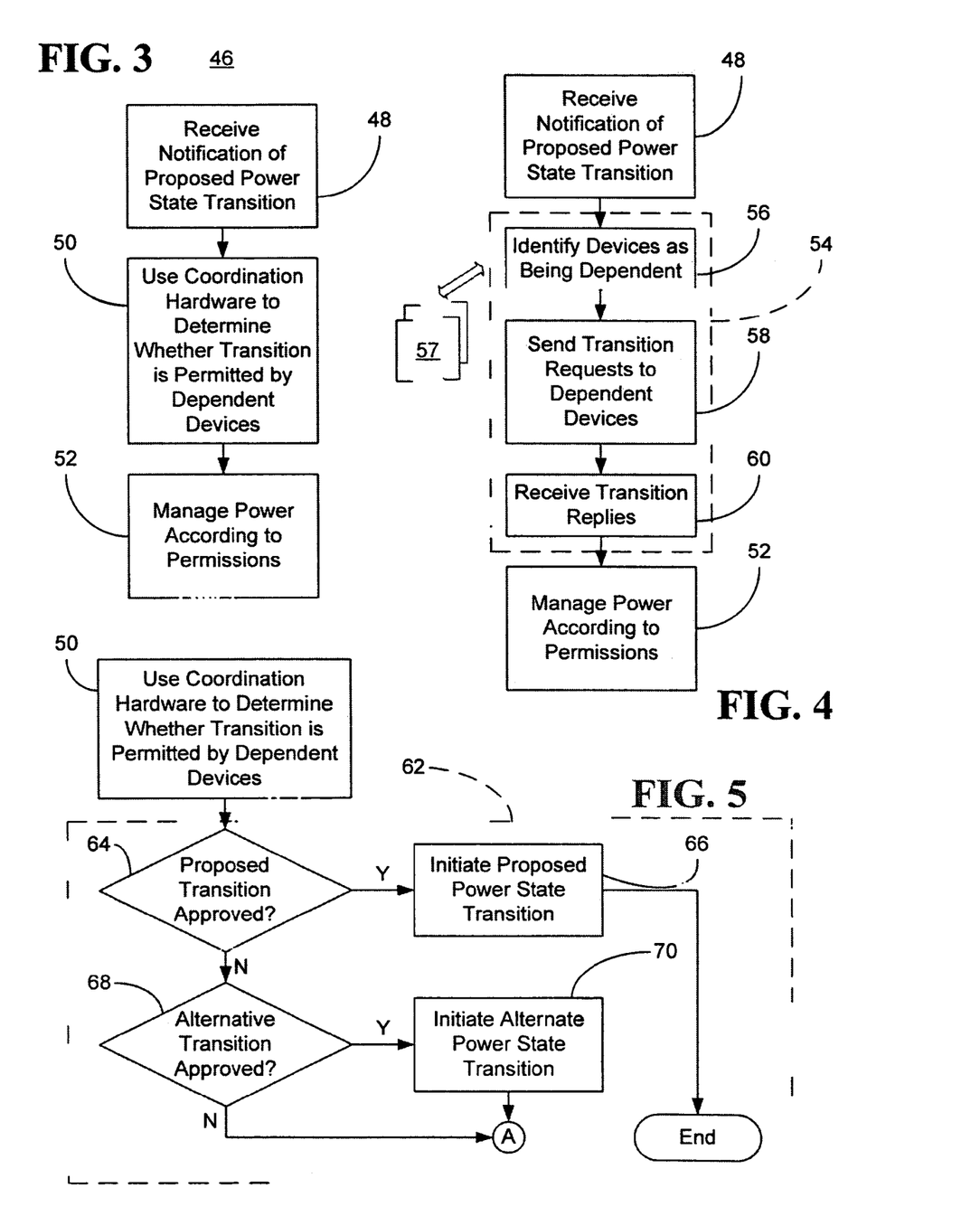
FIG. 3 is a flowchart of an example of a method of managing power state transitions according to one embodiment of the invention.
FIG. 4 is a flowchart of an example of a process of using coordination hardware to determine whether a power state transition in a primary device is permitted by a set of secondary devices according to one embodiment of the invention.
FIG. 5 is a flowchart of an example of a process of managing power based on secondary device permissions according to one embodiment of the invention.

FIG. 3 shows a method 46 of managing power. The method 46 can be implemented as an embedded logic circuit of an ASIC or any other commercially available hardware technique, as already discussed. Processing block 48 provides for receiving notification of a pending power state transition in a primary device. Typically, the notification will be received from software, although the notification may also be received from a hardware component such as a hardware-based monitor performing targeted performance feedback. Coordination hardware is used at block 50 to determine whether the power state transition is permitted by a set of secondary devices and block 52 provides for managing power for the primary device according to the permissions.

Turning now to FIG. 4, one approach to using coordination hardware to determine whether a power state transition is permitted is shown in greater detail at block 54. Accordingly, block 54 can be readily substituted for block 50 (FIG. 3) discussed above. Specifically, each device in the set of secondary devices is identified as being dependent on the power state transition at block 56. As already noted, identifying the dependent devices can be accomplished by accessing either an explicit or an implicit dependencies list 57, where the dependencies list is dedicated to the primary device. Block 58 provides for sending a set of transition requests to the set of secondary devices and block 60 provides for receiving a set of transition replies from the set of secondary devices, where each transition reply indicates whether the power state transition is permitted.

FIG. 5 shows one approach to managing power for the primary device according to secondary device permissions in greater detail at block 62. Accordingly, block 62 can be readily substituted for block 52 (FIG. 3) discussed above. In particular, block 64 provides for determining whether all of the transition replies indicate that the proposed power state transition is approved. If so, the proposed power state transition is initiated in the primary device at block 66. Otherwise, it is determined at block 68 whether one or more of the transition replies indicate that an alternative power state transition is permitted. In particular, if the proposed power state transition is to a lower state, the alternative power state might be an intermediate state between the current state and the proposed state. For example, the proposed power state transition could be from P2 to P4, where one of the secondary devices will only permit a transition from P2 to P3. The alternative power state transition can be determined by hardware and/or software performance monitors of a limiting secondary device, where the limiting secondary device transmits the alternative power state transition to the primary device in a transition reply. If an alternative power state is identified, block 70 provides for initiating the alternative power state in the primary device.

It should be noted that the coordination hardware can also provide for a retry protocol in which devices resubmit transition requests to their dependent devices. To facilitate the retry protocol a retry bit can be included in the transition requests, where the retry bit indicates whether a request being made is an initial request or a retry request. Thus, a transition request can be flagged as an initial request only the first time a particular power state transition is attempted. The flagging of a transition request as an initial request can serve as an indication to any device receiving the request that something on or within the primary device has caused the transmitting device to change its optimum power state (e.g., software choosing a new power state for the primary node). Such an indication can therefore cause the receiving devices to initiate a retry.

Figure 6:
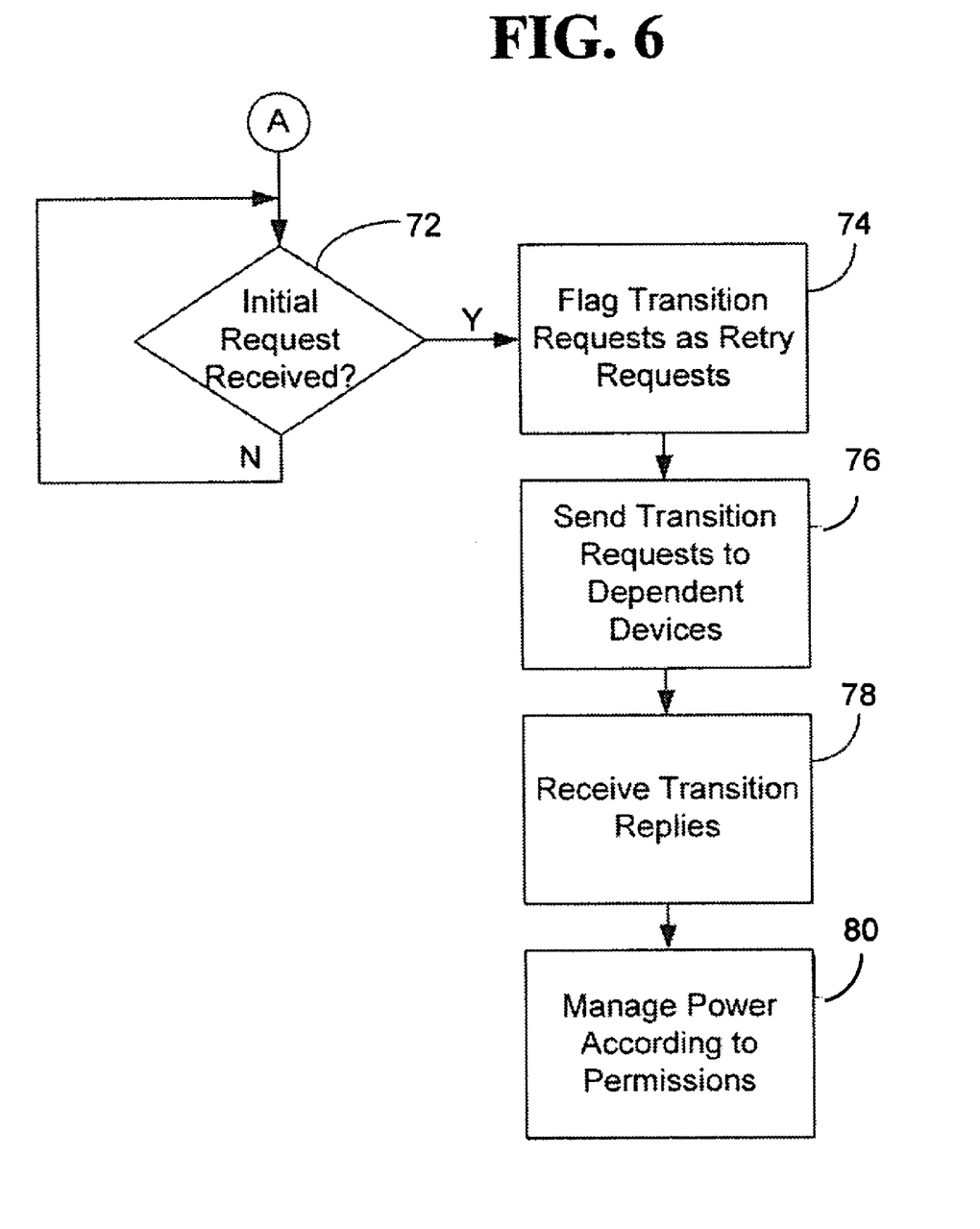
FIG. 6 is a flowchart of an example of a retry protocol according to one embodiment of the invention.

FIG. 6 demonstrates that it can be determined whether the primary device has received an initial request from one or more of the set of secondary devices at block 72. If so, each of the transition requests is flagged as a retry request at block 74 and the transition requests are re-sent to the secondary devices at block 76. Block 78 provides for receiving a set of transition replies and block 80 provides for managing the power of the primary device based on the replies. Alternatively, the primary device could simply poll the secondary devices periodically (i.e., repeat the re-sending on a periodic basis) in order to determine whether the initial request is permitted due to a change in the blocking condition. Such an approach would provide greater simplicity at the possible expense of lower performance and higher energy consumption.

One specific example of a retry protocol can be used after a primary device has attempted a transition to a lower power state and the result was a transition to a state having a non-optimum power level from the perspective of the primary device (i.e., no change or a change to some intermediate state). Since the primary device is not at the initially requested state, the primary device can make another attempt to transition to the initially requested state once the "blocking" conditions are no longer present. In such a case, if the primary device receives an initial transition request from one of the secondary devices, the request serves as an indication that the blocking condition may no longer be present because an initial transition request implies some sort of change in the power conditions of the transmitting device. The retry bit therefore informs the receiving secondary device as to whether or not a retry is necessary when a new request is detected. Otherwise, devices could engage in a perpetual exchange of retry requests (i.e., a "deadlocking" condition) because none of the devices are able to distinguish between an incoming request representing an actual power condition change and one merely representing a retry. In order to determine whether the initially requested state is allowable, the primary device re-sends the transition requests as retry requests.

Another example of a retry protocol can be implemented when a transition to a higher power state is requested by a secondary device (i.e., an "increasing" secondary device). In such a case, an increase in the power state of the primary device may also require an increase in the power levels of the remaining secondary devices to meet the performance requirements of the device initiating the increase. Accordingly, a primary device may re-send transition requests when a secondary device requests an increase in power state. Simply put, when a device detects an initial request to a power state that is higher than its own power state, the device can issue retry requests to determine its new coordinated-power state level.

Yet another example of a retry protocol can be used when a primary device has sent a transition request (either an initial or a retry request) and it receives an initial request from a secondary device before it has received replies from all of the secondary devices. Such a case would indicate that there is a possibility that some of the replies are stale and that retry requests should be issued.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. An apparatus comprising:
   a primary device to share a resource with a set of secondary devices; and
   coordination hardware to determine whether a pending power state transition in the primary device is permitted by the set of secondary devices; wherein the coordination hardware is to:
   receive notification of the power state transition;
   identify each device in the set of secondary devices as being dependent on the power state transition, wherein the coordination hardware is to access at least one of an explicit and an implicit dependencies list to identify whether one or more device in the set of secondary devices is being dependent on the power state transition;

send a set of transition requests to the set of secondary devices;

receive a set of transition replies from the set of secondary devices, each transition reply to indicate whether the power state transition is permitted.

2. The apparatus of claim 1, wherein the dependencies list is to be dedicated to the primary device.

3. The apparatus of claim 1, wherein the coordination hardware is to initiate the power state transition in the primary device if the transition replies indicate that the power state transition is permitted.

4. The apparatus of claim 1, wherein the coordination hardware is to initiate an alternative power state transition in the primary device if one or more of the transition replies indicate that the alternative power state transition is permitted, the alternative power state transition to be based on a performance requirement of a limiting secondary device.

5. The apparatus of claim 4, wherein the coordination hardware is to flag each of the transition requests as a retry request and to re-send the set of transition requests to the set of secondary devices.

6. The apparatus of claim 5, wherein the coordination hardware is to re-send the set of transition requests in response to receiving a transition request from one or more of the secondary devices.

7. The apparatus of claim 5, wherein the coordination hardware is to repeat the re-sending on a periodic basis.

8. The apparatus of claim 1, wherein the notification is to be received from software.

9. The apparatus of claim 1, wherein the primary device includes a processor and one or more of the secondary devices is to include a processor.

10. The apparatus of claim 1, wherein the set of secondary devices is to include a single device.

11. The apparatus of claim 1, wherein the set of secondary devices is to include a plurality of devices.

12. The apparatus of claim 1, wherein the resource is to include a cache.

13. A method comprising:

receiving notification of a pending power state transition; and using coordination hardware to determine whether the power state transition in a primary device is permitted by a set of secondary devices, the primary device sharing a resource with the set of secondary devices, wherein using the coordination hardware to determine whether the power state transition is permitted includes:

identifying each device in the set of secondary devices as being dependent on the power state transition, wherein identifying each device in the set of secondary devices as being dependent includes accessing at least one of an explicit and an implicit dependencies list;

sending a set of transition requests to the set of secondary devices; and receiving a set of transition replies from the set of secondary devices, each transition reply indicating whether the power state transition is permitted.

14. The method of claim 13, further wherein the dependencies list is dedicated to the primary device.

15. The method of claim 13, further including initiating the power state transition in the primary device if the transition replies indicate that the power state transition is permitted.

16. The method of claim 13, further including initiating an alternative power state transition in the primary device if one or more of the transition replies indicate that the alternative power state transition is permitted, the alternative power state transition being based on a performance requirement of a limiting secondary device.

17. The method of claim 16, further including:

flagging each of the transition requests as a retry request; and re-sending the set of transition requests to the set of secondary devices.

18. The method of claim 17, wherein the set of transition requests is re-sent in response to receiving a transition request from one or more of the secondary devices.

19. The method of claim 17, further including repeating the resending on a periodic basis.

20. The method of claim 13, wherein receiving the notification of the power state transition includes receiving the identification from software.

21. A system comprising:

a primary processor having a cache;

a set of secondary processors operatively coupled to the primary processor, the primary processor to share the cache with the set of secondary processors;

a point-to-point network interconnect coupled to the primary processor and the set of secondary processors; and coordination hardware to determine whether a pending power state transition in the primary processor is permitted by the set of secondary processors, wherein the coordination hardware is to:

receive notification of the power state transition;

identify each processor in the set of secondary processors as being dependent on the power state transition, wherein the coordination hardware is to access at least one of an explicit and an implicit dependencies list to identify each processor in the set of secondary processors as being dependent on the power state transition;

send a set of transition requests to the set of secondary processors; and receive a set of transition replies from the set of secondary processors, each transition reply indicating whether the power state transition is permitted.

22. The system of claim 21, wherein the dependencies list is dedicated to the primary processor.

23. The system of claim 21, wherein the coordination hardware is to initiate the power state transition in the primary processor if the transition replies indicate that the power state transition is permitted.

24. The system of claim 21, wherein the coordination hardware is to initiate an alternative power state transition in the primary processor if one or more of the transition replies indicate that the alternative power state transition is permitted, the alternative power state transition to be based on a performance requirement of a limiting secondary device.

25. The system of claim 24, wherein the coordination hardware is to flag each of the transition requests as a retry request and to re-send the set of transition requests to the set of secondary devices.

26. The system of claim 25, wherein the coordination hardware is to re-send the set of transition requests in response to receiving a transition request from one or more of the secondary devices.

27. The system of claim 25, wherein the coordination hardware is to repeat the re-sending on a periodic basis.

28. The system of claim 21, wherein the notification is to be received from software.

29. The system of claim 21, wherein the set of secondary processors includes a single processor.

30. The system of claim 21, wherein the set of secondary processors is to include a plurality of processors.

31. The system of claim 21, wherein the network interconnect has a layered communication protocol.

* * * * *